US009369697B2

(12) United States Patent
Kumagai et al.

(10) Patent No.: US 9,369,697 B2
(45) Date of Patent: Jun. 14, 2016

(54) MEASURING INSTRUMENT FOR PREPARING THREE-DIMENSIONAL POINT CLOUD MODEL

(71) Applicant: Kabushiki Kaisha TOPCON, Itabashi-ku, Tokyo-to (JP)

(72) Inventors: Kaoru Kumagai, Tokyo-to (JP); Hitoshi Otani, Tokyo-to (JP); Naoto Kasori, Tokyo-to (JP); You Sasaki, Tokyo-to (JP); Jun Sasagawa, Tokyo-to (JP); Nobuyuki Fukaya, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 234 days.

(21) Appl. No.: 14/190,688

(22) Filed: Feb. 26, 2014

(65) Prior Publication Data

US 2014/0253689 A1    Sep. 11, 2014

(30) Foreign Application Priority Data

Mar. 8, 2013    (JP) ................................ 2013-046640

(51) Int. Cl.
*H04N 13/02*    (2006.01)
*G01C 3/00*    (2006.01)
*G01C 11/06*    (2006.01)

(52) U.S. Cl.
CPC .............. *H04N 13/0275* (2013.01); *G01C 3/00* (2013.01); *G01C 11/06* (2013.01)

(58) Field of Classification Search
CPC ... H04N 13/0275; H04N 13/0271; G01C 3/00
USPC .............................. 348/46, 135, 142; 382/106
See application file for complete search history.

(56) References Cited

U.S. PATENT DOCUMENTS 7,697,126 B2 * 4/2010 Farsaie ..................... G01C 3/08
                                                      356/141.1
7,804,996 B2   9/2010 Ohtomo et al.
(Continued)

FOREIGN PATENT DOCUMENTS

JP    2006-10376 A    1/2006
JP    2011-203196 A   10/2011
(Continued)

OTHER PUBLICATIONS

European communication dated Jun. 30, 2014 in corresponding European patent application No. 14156937.6.
(Continued)

*Primary Examiner* — David Harvey
(74) *Attorney, Agent, or Firm* — Nields, Lemack & Frame, LLC

(57) ABSTRACT

A measuring instrument comprises a spherical camera (8) for acquiring image data over total circumference, a laser scanner (6, 7) installed integrally with the spherical camera and for acquiring point cloud data of the surroundings, a synchronous control unit (9) for controlling acquisition of data of the spherical camera and the laser scanner, a storage unit (12) for recording the image data and the point cloud data, an absolute scale acquiring means for acquiring an absolute scale for obtaining an absolute position of when images are photographed by the spherical camera, and a control arithmetic unit (10), wherein the control arithmetic unit calculates a 3D model based on the image data, the point cloud data, and the absolute position.

7 Claims, 8 Drawing Sheets

(56) References Cited

U.S. PATENT DOCUMENTS

| | | | |
|---|---|---|---|
| 2005/0286760 A1 | 12/2005 | Ohtomo et al. | |
| 2011/0007939 A1 | 1/2011 | Teng et al. | |
| 2014/0210950 A1* | 7/2014 | Atanassov | G06T 7/0083 348/47 |

FOREIGN PATENT DOCUMENTS

| | | |
|---|---|---|
| JP | 2012-533222 A | 12/2012 |
| WO | 98/12504 A1 | 3/1998 |

OTHER PUBLICATIONS

Proceedings of 2004 IEEE/RSJ International Conference on Intelligent Robots and Systems (IROS 2004), Sep. 28-Oct. 2, 2004, Sendai, Japan, vol. 4, Sep. 28, 2004, pp. 3430-3435, "3D Modeling of Indoor Environments by a Mobile Robot with a Laser Scanner and Panoramic Camera", Biber, et al.

2009 IEEE Conference on Computer Vision and Pattern Recognition: CVPR 2009, Miami Beach, FL, Jun. 20-25, 2009, pp. 2906-2912, "Piecewise Planar City 3D Modeling from Street View Panoramic Sequences", Micusik, et al.

"3D Lidar-Camera Intrinsic and Extrinsic Calibration: Observability Analysis and Analytical Least Squares-based Initialization", Jan. 1, 2012, XP055124525, pp. 1-12, retrieved from the Internet: URL: http://www-users.cs.umn.edu/faraz/pdfs/VelodyneLadybug.pdf, retrieved on Jun. 20, 2014, Mirzaei, et al.

Proceedings of 2004 IEEE/RSJ International Conference on Intelligent Robots and Systems (IROS 2004), Sep. 28-Oct. 2, 2004, Sendai, Japan, vol. 3, Sep. 28, 2004, pp. 2301-2306, "Extrinsic Calibration of A Camera and Laser Range Finder (improves camera calibration)", Zhang, et al.

\* cited by examiner

MEASURING INSTRUMENT FOR PREPARING THREE-DIMENSIONAL POINT CLOUD MODEL

BACKGROUND OF THE INVENTION

The present invention relates to a measuring instrument, by which three-dimensional measurement can be accomplished under a circumstance where position measurement by the GPS cannot be carried out such as an indoor space or a tunnel, etc.

In a case of the measurement of indoor space, tunnel, etc., an attention has been drawn on a system in which scanning is performed by moving a one-dimensional (line) laser scanner, and a three-dimensional point cloud model of the entirety is prepared while moving.

In order to prepare the three-dimensional point cloud model, it is necessary to specify a position (self-localization) from which measurement is carried out. Further, the GPS has become widespread as a measuring system for specifying the self-localization, but normally, in a case where the place of measurement is indoor space, tunnel, etc., the GPS for specifying self-localization is in an environment where the GPS cannot be used.

As means for specifying the self-localization when the GPS cannot be used, an IMU with high accuracy and a scanner are generally used. However, IMU is expensive, and there are problems such as deterioration in accuracy is caused by a drift or a calibration is troublesome.

SUMMARY OF THE INVENTION

It is an object of the present invention to provide a measuring instrument, which has an inexpensive configuration, and the self-localization can be easily specified, and further, which can prepare three-dimensional point cloud model.

To attain the above object, the measuring instrument according to the present invention comprises an spherical camera for acquiring image data over total circumference, a laser scanner installed integrally with the spherical camera and for acquiring point cloud data of the surroundings, a synchronous control unit for controlling acquisition of data of the spherical camera and the laser scanner, a storage unit for recording the image data and the point cloud data, an absolute scale acquiring means for acquiring an absolute scale for obtaining an absolute position of when images are photographed by the spherical camera, and a control arithmetic unit, wherein the control arithmetic unit calculates a 3D model based on the image data, the point cloud data, and the absolute position.

Further, in the measuring instrument according to the present invention, the absolute scale acquiring means extracts an absolute scale object to indicate a length already known from an image acquired by the spherical camera, and the actual size in the image is obtained from the absolute scale object.

Further, the measuring instrument according to the present invention, further comprises a total station installed at a predetermined position and a prism integrally provided with the spherical camera, wherein the absolute scale acquiring means has the total station and the prism to be installed on the measuring instrument, and the absolute scale is acquired when the total station measure the position of the prism.

Further, in the measuring instrument according to the present invention, at least the spherical camera, the laser scanner, the synchronous control unit, and the storage unit are provided on a moving vehicle, wherein the synchronous control unit synchronously controls the acquisition of the image data by the spherical camera at predetermined time intervals and the acquisition of the point cloud data by the laser scanner when the moving vehicle is moving, the time of acquisition of the image data and the point cloud data are put on the image data and the point cloud data as time stamps, and the image data and the point cloud data are associated with each other based on the time stamps.

Furthermore, in the measuring instrument according to the present invention, the control arithmetic unit carries out photogrammetry based on images adjacent to each other, converts the position where each of the images have been acquired based on the absolute scale obtained by the absolute scale acquiring means to an absolute scale, calculates the position where the point cloud has been acquired based on the absolute scale, synthesizes the point cloud data to the image, prepares a local 3D model, and further, the control arithmetic unit sequentially combines the 3D models adjacent to each other, and prepares a wide-area 3D model of the entire measurement range.

According to the present invention, the measuring instrument comprises an spherical camera for acquiring image data over total circumference, a laser scanner installed integrally with the spherical camera and for acquiring point cloud data of the surroundings, a synchronous control unit for controlling acquisition of data of the spherical camera and the laser scanner, a storage unit for recording the image data and the point cloud data, an absolute scale acquiring means for acquiring an absolute scale for obtaining an absolute position of when images are photographed by the spherical camera, and a control arithmetic unit, wherein the control arithmetic unit calculates a 3D model based on the image data, the point cloud data, and the absolute position. As a result, a measuring instrument, which is an inexpensive configuration, moreover, the self-localization can be easily specified, and further the three-dimensional point cloud model can be prepared.

Further, according to the present invention, in the measuring instrument, the absolute scale acquiring means extracts an absolute scale object to indicate a length already known from an image acquired by the spherical camera, and the actual size in the image is obtained from the absolute scale object. As a result, it is not necessary to have a special measuring instrument if the absolute scale object of the absolute scale acquiring means is designed to have a length already known by measuring in advance, and the measuring instrument can be an inexpensive configuration and moreover a simple instrument.

Further, according to the present invention, the measuring instrument further comprises a total station installed at a predetermined position and a prism integrally provided with the spherical camera, wherein the absolute scale acquiring means has the total station and the prism to be installed on the measuring instrument, and the absolute scale is acquired when the total station measure the position of the prism. As a result, by an applicable total station, the measuring of the photographing position is possible, and the preparing of the 3D model is possible even under a circumstance where GPS cannot be used such as indoor spaces and tunnels.

Further, according to the present invention, in the measuring instrument, at least the spherical camera, the laser scanner, the synchronous control unit, and the storage unit are provided on a moving vehicle, wherein the synchronous control unit synchronously controls the acquisition of the image data by the spherical camera at predetermined time intervals and the acquisition of the point cloud data by the laser scanner when the moving vehicle is moving, the time of acquisition of the image data and the point cloud data are put on the image data and the point cloud data as time stamps, and the image data and the point cloud data are associated with each other based on the time stamps. As a result, image data and point cloud data are acquired at first, and the preparing of the 3D model can be carried out.

Furthermore, according to the present invention, in the measuring instrument, the control arithmetic unit carries out photogrammetry based on images adjacent to each other, converts the position where each of the images have been acquired based on the absolute scale obtained by the absolute scale acquiring means to an absolute scale, calculates the position where the point cloud has been acquired based on the absolute scale, synthesizes the point cloud data to the image, prepares a local 3D model, and further, the control arithmetic unit sequentially combines the 3D models adjacent to each other, and prepares a wide-area 3D model of the entire measurement range. As a result, it is possible to acquire the 3D model of the entire scope over the wide range.

DETAILED DESCRIPTION OF THE PREFERRED EMBODIMENT

Description will be given below on an embodiment of the present invention by referring to the attached drawings.

Figure 1:
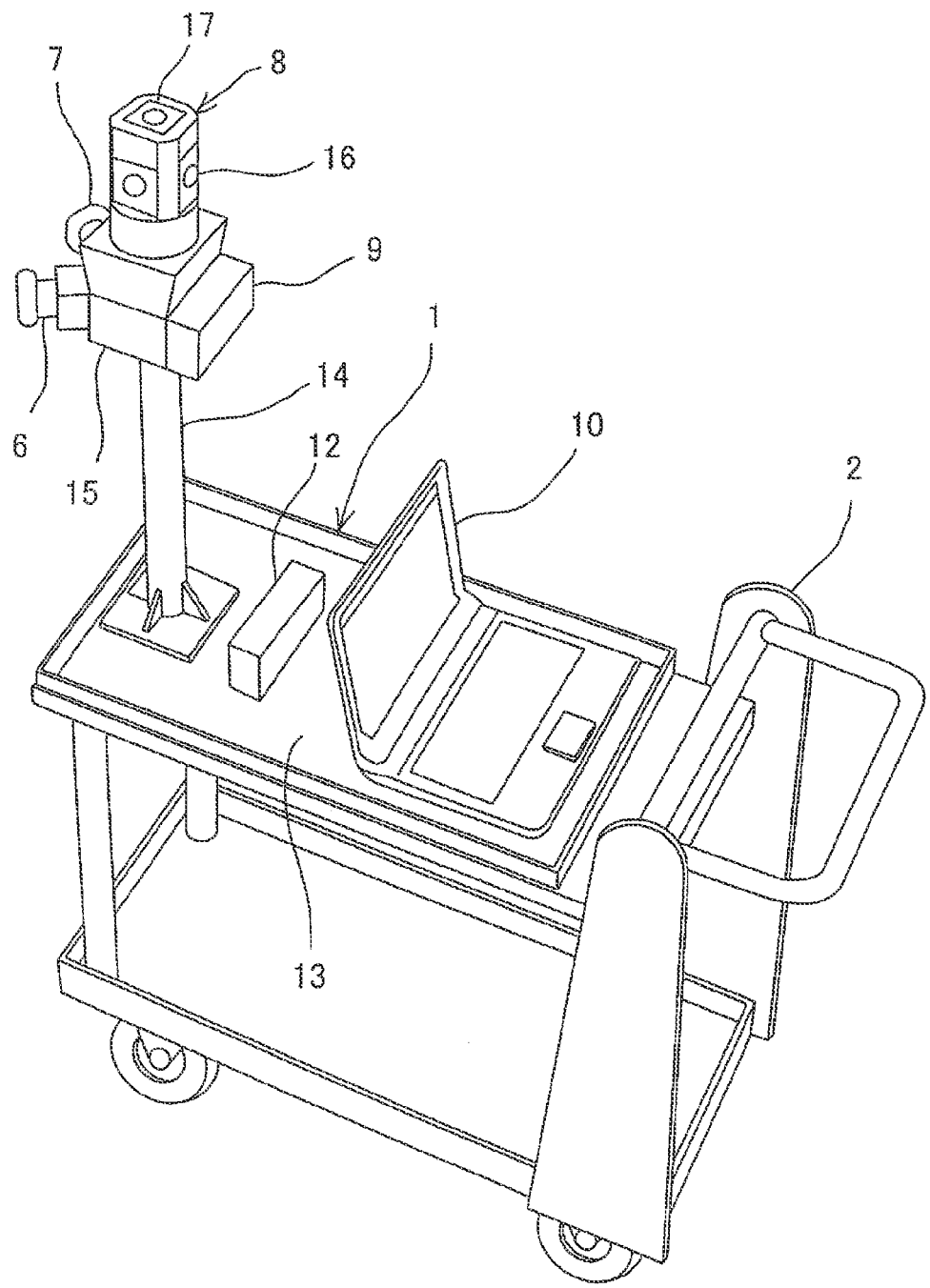
FIG. 1 is a perspective view of an embodiment according to the present invention.
Figure 2:
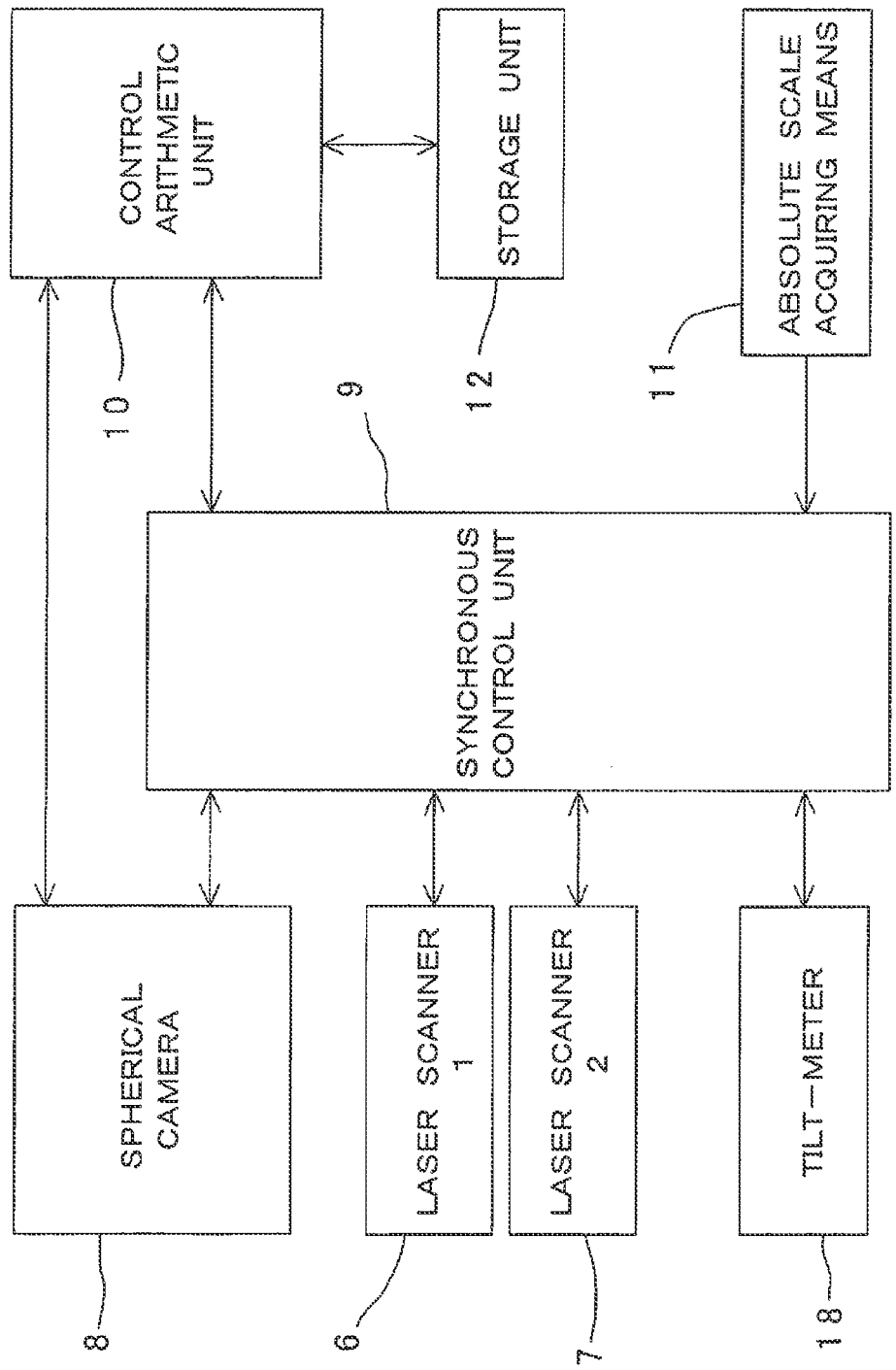
FIG. 2 is a block diagram to show an approximate arrangement of the embodiment.

In FIG. 1, reference numeral 1 denotes a measuring instrument, and reference numeral 2 denotes a moving vehicle 2, on which the measuring instrument 1 is installed. Although a carrying cart is shown in the figure as the moving vehicle 2, it would suffice that the measuring instrument 1 can be installed on the moving vehicle 2 and can be moved. Further, the moving vehicle 2 may be designed as a self-running type or a remotely operable type, and there is no special restriction on the moving vehicle 2.

Description will be given on the measuring instrument 1.

The measuring instrument 1 primarily comprises laser scanners 6 and 7, an spherical camera 8, a synchronous control device 9, a control arithmetic unit (PC) 10, an absolute scale acquiring means 11, and a storage unit 12. The laser scanners 6 and 7 and the spherical camera 8 are in an integrated condition, i.e. the laser scanners 6 and 7 and the spherical camera 8 are in a physically fixed condition, and further, calibration is performed in advance, and the positional relation between the laser scanners 6 and 7 and the spherical camera 8 is determined. Detailed description will be given below.

A supporting pillar 14 is erected as a supporting means on a front portion of a system base 13. On an upper end of the supporting pillar 14, a mounting frame 15 is provided as a mounting means, and two sets of the laser scanners 6 and 7 are mounted on the mounting frame 15 symmetrically at left and right with respect to an advancing direction.

Each of the laser scanners 6 and 7 is a one-dimensional laser scanner, which scans a pulsed beam in vertical direction and acquires point cloud data. Further, the reference optical axes of the laser scanners 6 and 7 run horizontally, and these reference optical axes run in a diagonally forward direction with respect to the advancing direction of the moving vehicle 2 or run in a direction to perpendicularly cross the advancing direction.

On an upper surface of the mounting frame 15, the spherical camera 8 is mounted. The spherical camera 8 is configured so as to acquire images over the total circumference (360°) and images in the upper direction. For instance, the spherical camera 8 has four cameras 16 directed in front, rear, left, and right with respect to the advancing direction respectively and a camera 17 directed in upward direction. It is to be noted that the number of the cameras is determined according to a field angle of the camera.

Each of the camera 16 and the camera 17 is a digital camera and the like, has a CCD or a CMOS sensor as an image pickup element, and can output the image data acquired as digital signals. Further, the camera 16 and the camera 17 can identify coordinates of pixels in the image pickup element, and can acquire video images (frame images acquired in a predetermined time interval) and still images.

The synchronous control unit 9 is provided at a position as required on the mounting frame 15, for instance, at a position where no interference occurs with the beam projecting range of the laser scanners 6 and 7 (in the figure, the rear surface of the mounting frame 15). The synchronous control unit 9 synchronously controls the image acquiring timing by the spherical camera 8 and the point cloud data acquiring timing by the laser scanners 6 and 7, and controls a time interval of acquiring the image by the spherical camera 8 and the time interval of acquiring the point cloud data by the laser scanners 6 and 7.

The point cloud data acquired by the laser scanners 6 and 7, and the image data acquired by the spherical camera 8 are associated with each other based on the acquiring time, stored in the storage unit 12, or stored in the storage unit 12 via the control arithmetic unit 10.

Further, a tilt-meter 18 is provided at a position as required on the system base 13 or on the mounting frame 15, and the like. The tilt-meter 18 can detect a tilting at least in the advancing direction (downward tilting or upward tilting). The tilt angle and tilting direction detected by the tilt-meter 18 are inputted to the synchronous control unit 9 and are stored in the storage unit 12 via the control arithmetic unit 10. Further, it would be better to install a tilt-meter which detect a tilting perpendicularly crossing with respect to the advancing direction. It is to be noted that, in a case where the measurement is carried out on the horizontal plane by the measuring instrument 1, the tilt-meter may be omitted.

In the storage unit 12, the image data acquired by the spherical camera 8 and the point cloud data and the like acquired by the laser scanners 6 and 7 are stored, and various types of programs are stored.

The programs include, for instance, an image processing program for performing image processing with respect to the image, as acquired by the spherical camera 8, such as the extraction of feature points, an image tracking program to perform tracking by using the feature points in the video image data, a program for carrying out photogrammetry, an absolute scale acquiring program for acquiring the absolute scale for image correction by extracting a known length from the image, a conversion program for converting a relative length in the image to actual size based on the absolute scale acquired, a program for calculating a 3D model based on the image data acquired and on the point cloud data acquired, and other programs.

The absolute scale acquiring means 11 is to acquire data (absolute scale) which represent the absolute value. By acquiring the absolute scale, it becomes possible to determine the actually measured value of the moving amount of the moving vehicle 2, and an absolute value of the base line length necessary for photogrammetry can be obtained.

The control arithmetic unit 10 performs the processing as required to the image data acquired and the point cloud data acquired according to the programs as described above, or calculates and prepares 3D model, etc.

Figure 3:
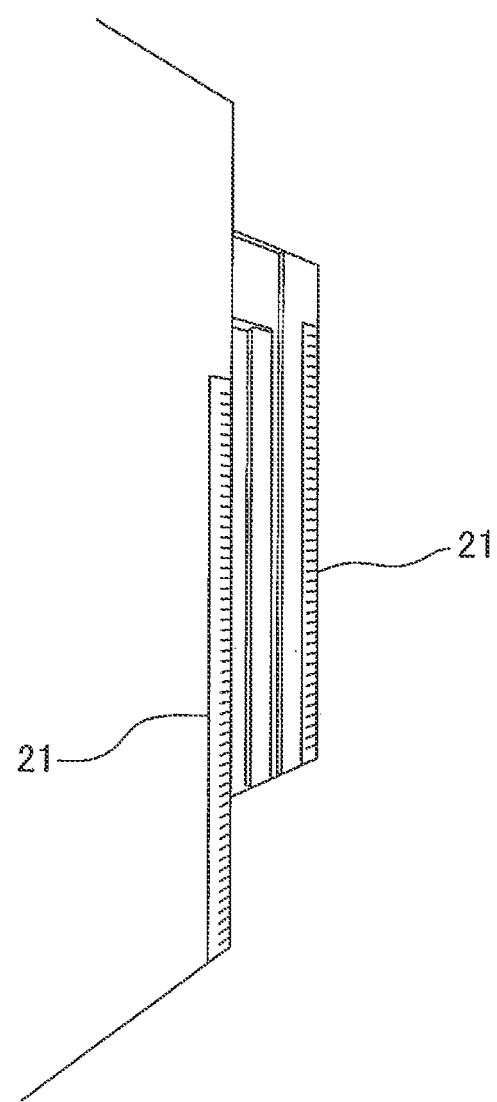
FIG. 3 is a perspective view to show one example of an absolute scale to be used in the absolute scale acquiring means of the embodiment.

First, as one example of the absolute scale acquiring means 11, there is means to use a known length included in the images acquired by the spherical camera 8. The known length is, for instance, an interval between pillars of a building, a width or height of an entrance/exit. Or a plurality of targets are set, the intervals of the targets are measured in advance and are regarded to be known. Or, an absolute scale object 21 is set up (see FIG. 3) at a predetermined position within a photographing range, e.g. at adequate positions such as a starting point, an intermediate point, or an end point of the start of photographing. A scale to indicate a known length is provided on the absolute scale object 21. Here, in a case where a specific part of a building is utilized, the door, the pillar, and the like will be regarded as absolute scale objects.

In the following, description will be given on a case where a measurement is performed to an inside of a building or an inside of a room. Further, it is supposed here that the absolute scale object 21 is used as an object to indicate a known length. It is preferable that the absolute scale object 21 to be used has bar codes so that an image-recognition can be performed. By using the bar code, the position on the bar code can be automatically recognized by frequency analysis from the images photographed by the spherical camera 8.

While moving the moving vehicle 2, the laser scanners 6 and 7 vertically scan in a diagonally forward direction, and acquire point cloud data. Further, by the spherical camera 8, images each (image for one frame) are acquired at the predetermined time interval. Further, it is so arranged that the absolute scale objects 21 are included in the images at the interval as required.

If it is set that the absolute scale objects 21 are included in each of the frame images, actual measurement and correction can be made for each photogrammetry respectively when photogrammetry is performed between the frame images. As a result, errors do not accumulate, and the measurement accuracy increases.

The frame photographing time (shutter time) of the spherical camera 8 and the point cloud data of the laser scanners 6 and 7 are outputted by putting time stamps on, and an omnidirectional image and point cloud data of the inside of the room, which is an object to be measured, are acquired. Each of the frame images and the point cloud data can be associated with the time by using the time stamp.

Figure 4:
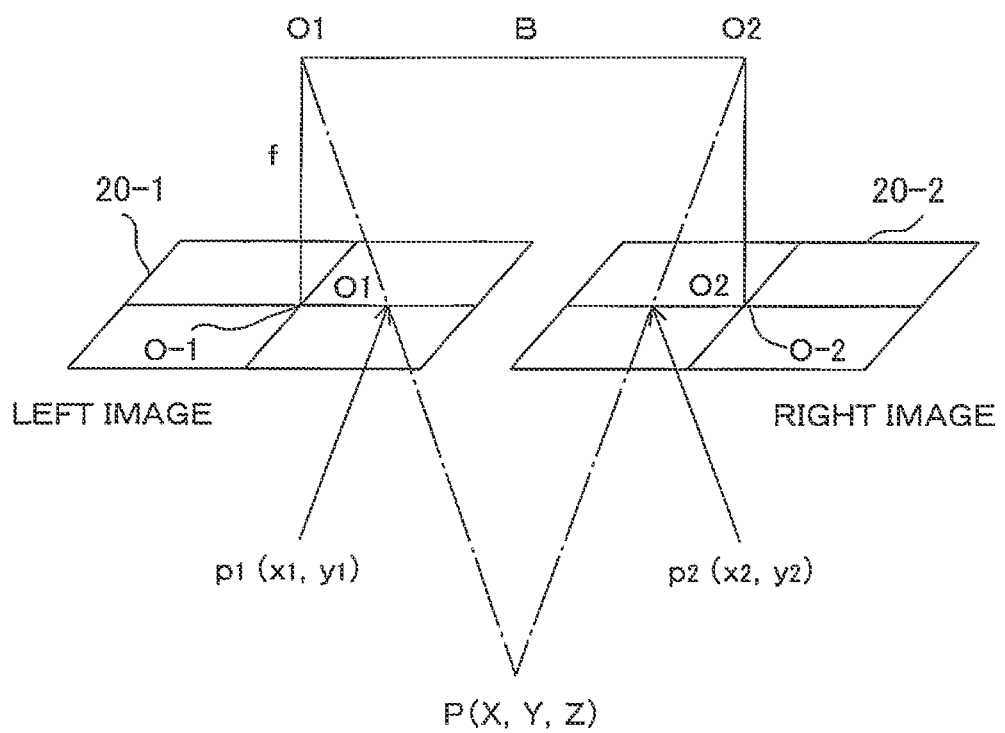
FIG. 4 is an explanatory drawing to explain the principle of photogrammetry.

FIG. 4 shows a principle of photogrammetry.

Under the condition that two optical axes run in parallel to each other, images 20-1 and 20-2 are acquired at known positions O1 and O2 respectively. A measuring point P (X, Y, Z) is represented as p1 (x1, y1) in the image 20-1, and is also represented as P2 (x2, y2) in the image 20-2.

It is to be noted that, in the figure, reference letter "f" represents a focal length, and reference letter "B" represents a distance (base line length) between the positions O1 and O2.

If three-dimensional coordinates (3D coordinates) of the positions O1 and O2 are identified, a measuring point P (X, Y, Z) can be obtained from geometrical relationship.

In the present embodiment, the camera 16 is installed on the moving vehicle 2. Coordinates of the two points can be acquired by the absolute scale acquiring means 11, and the base line length B can be obtained from coordinates of the two points thus acquired. Relative orientation is performed on the images 20-1 and 20-2, and a condition shown in FIG. 4 can be realized by performing coordinate conversion on either one of the images with respect to the coordinate system of the other.

As for the relative orientation, feature points (pass points) are extracted by image processing from the image 20-1. The extracted feature points are specified in the image 20-2 by the video image tracking, and an image matching is carried out on both of the images 20-1 and 20-2 based on the feature points. It is to be noted that relative orientation and image tracking are described in the Japanese Patent Publication JP-A-2006-10376.

Further, by using the images and the point cloud data adjacent to each other in terms of time, three-dimensional model (3D model) obtained at each photographing point are sequentially synthesized. Thereby a wide range 3D model for the entire measurement range can be prepared.

Further, in a case where the moving vehicle 2 moves on an inclined surface, the tilting of the moving vehicle 2 is detected by the tilt-meter 18, and the displacement in up-to-bottom direction is calculated based on the tilt angle and the moving distance.

Figure 5:
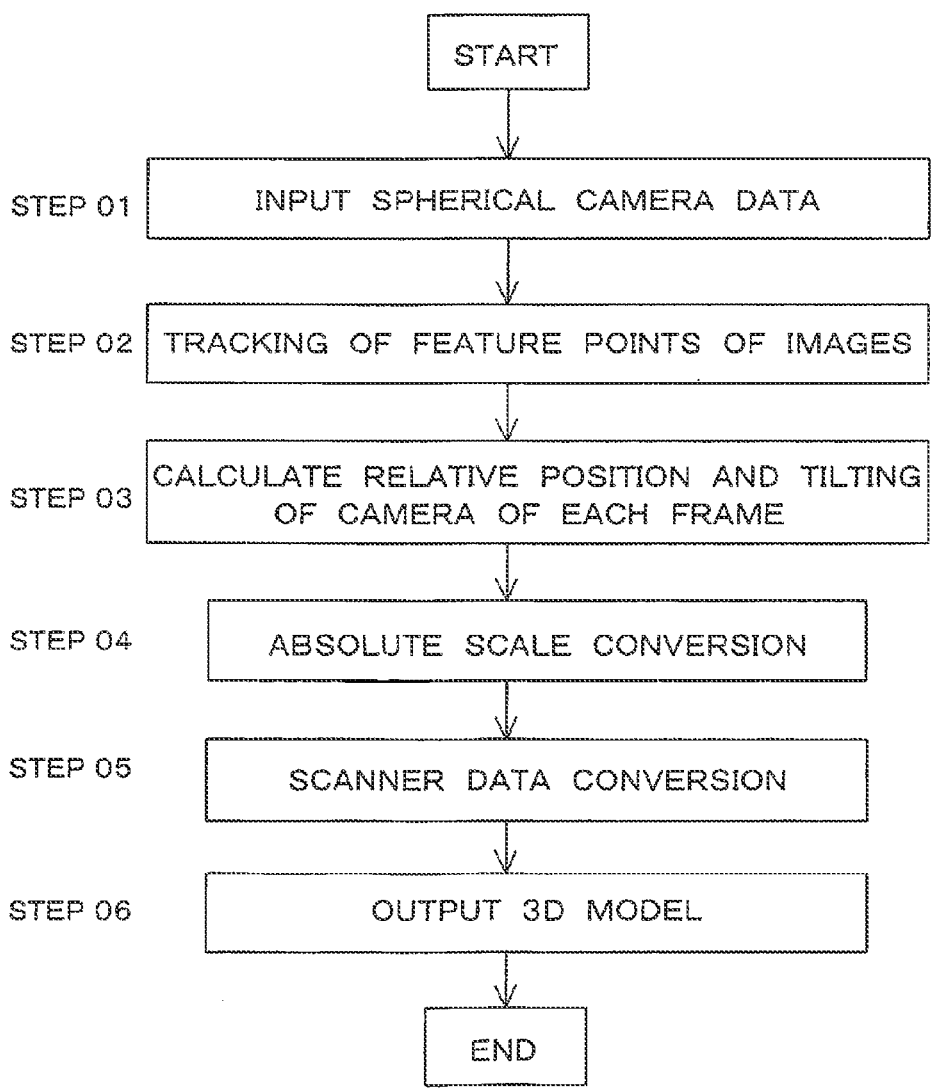
FIG. 5 is a flowchart to show an operation of the present embodiment.

Referring to FIG. 5, description will be given below on operation of the present embodiment.

(Step 01) While moving the moving vehicle 2, images are acquired by the spherical camera 8. The image acquired is a video image, or a still image acquired at predetermined time interval (image to be used in photogrammetry). Point cloud data are acquired by the laser scanners 6 and 7. Further, time stamps are put on the still image and the point cloud data respectively, and association can be performed between both the data based on the time stamps.

(Step 02) The control arithmetic unit 10 extracts feature points from the first image and specifies feature points corresponding the feature points of the first image in the next acquiring images. Specifying of the feature points to the next image is carried out by matching based on image tracking.

(Step 03) The control arithmetic unit 10 performs relative orientation based on the feature points thus acquired, and relative position and tilting (attitude) of the spherical camera 8 in each frame are calculated.

(Step 04) The absolute scale acquiring means 11 extracts the absolute scale object 21 from the image, obtains the actual size from the absolute scale object 21. Based on relative length in the image and on the actual size shown by the absolute scale object 21, absolute scale conversion is performed on the position of the camera corresponding to each image. When the position of each camera is converted by absolute scale conversion, a distance (base line length) between two positions of the camera, which has acquired the images adjacent to each other, can be actually measured.

When absolute scale conversion (absolute orientation) is performed by the control arithmetic unit 10 on relative coordinates obtained by the relative orientation, absolute coordinates can be acquired.

(Step 05) Point cloud data corresponding to the absolute orientated image are read according to the time stamp, and coordinates are given to the point cloud data based on the position and the attitude of the spherical camera 8 at the time when the absolute orientated image has been acquired.

(Step 06) When the control arithmetic unit 10 overlaps the point cloud data on the image, an image (local 3D model image) having coordinate data at a predetermined photographing point can be prepared. It is to be noted that, a color of the coordinate position of the image corresponding to the coordinate position of the point cloud data can be acquired, and coloring of the point cloud data can be carried out. The point cloud data thus colored are outputted as a 3D model of the point cloud data.

By referring to FIG. 6 and FIG. 7, calculation methods to give coordinates to the point cloud data will be given below.

Variables are defined as follows:

T_s→c: Scanner coordinate system→Translational vector of the camera coordinate system $$T\_s \to c = \begin{pmatrix} \Delta X \\ \Delta Y \\ \Delta Z \end{pmatrix}$$ [Mathematical formula 1]

R_s→c: Scanner coordinate system→Rotation matrix of the camera coordinate system $$R\_s \to c = \begin{pmatrix} el_{11} & el_{12} & el_{13} \\ el_{21} & el_{22} & el_{23} \\ el_{31} & el_{32} & el_{33} \end{pmatrix}$$ [Mathematical formula 2]

Figure 6:
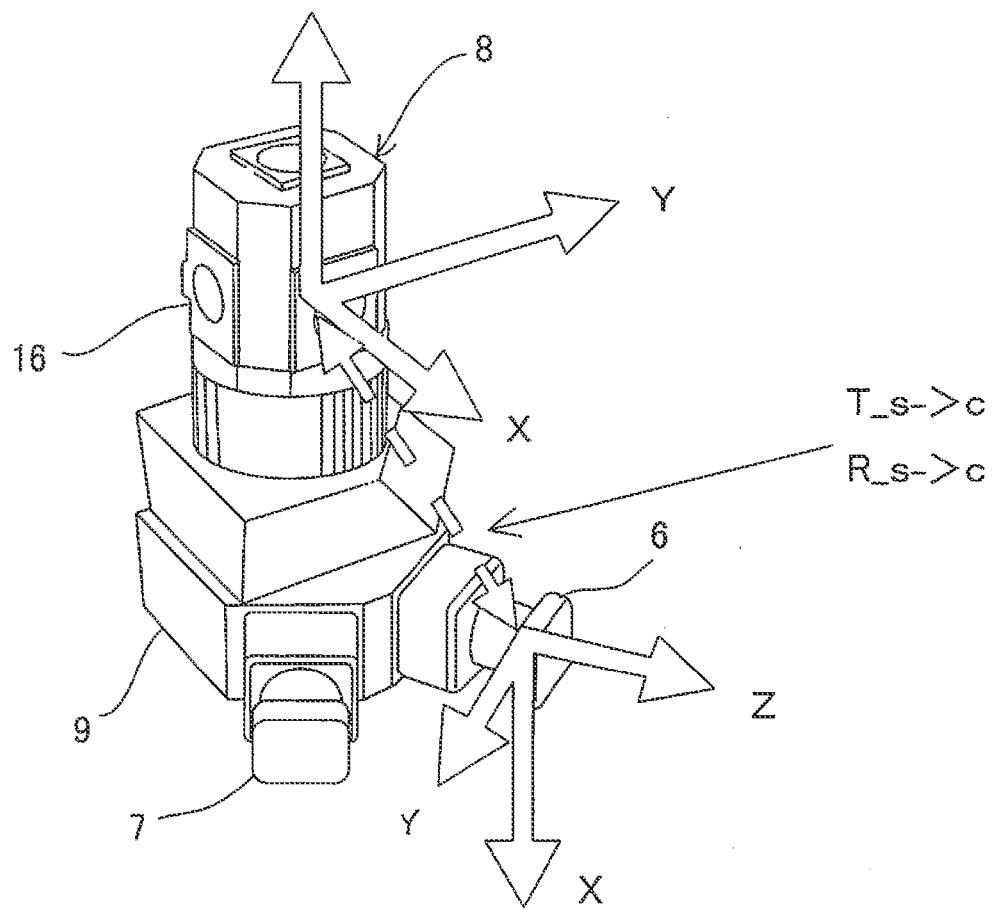
FIG. 6 is an explanatory drawing of a case where coordinates are given to a point cloud data.

These variables are regarded as determined by calibration (See FIG. 6).

Here, it is supposed that T_ represents a translational vector of 3-row and 1-column, R_ represents a rotation matrix of 3-row and 3-column, and P_** represents a three-dimensional coordinate.

Figure 7:
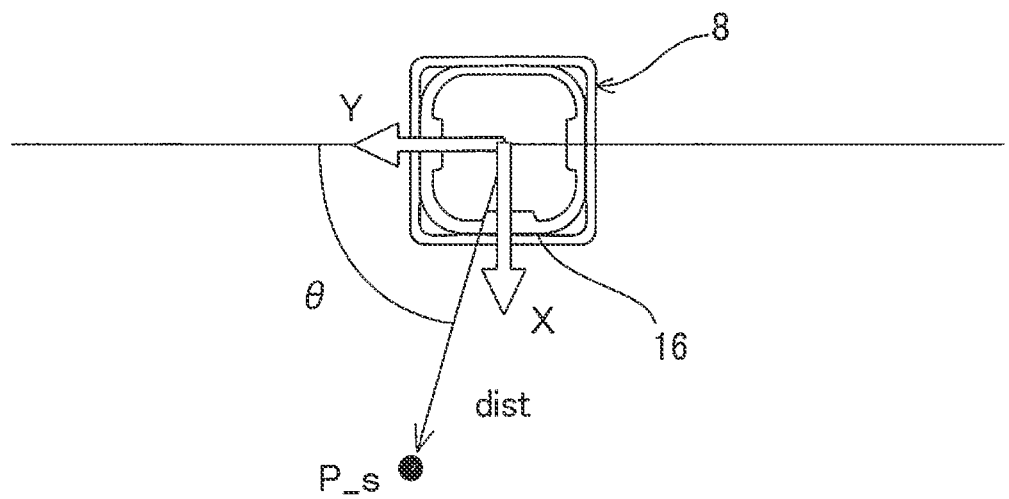
FIG. 7 is an explanatory drawing of a case where coordinates are given to a point cloud data.

First, measured coordinate value P_s in the scanner coordinate system is obtained by the scanning data (distance to be measured, angle to be measured) (See FIG. 7).

$$P\_s = \begin{pmatrix} dist * \sin(\theta) \\ dist * \cos(\theta) \\ 0.0 \end{pmatrix}$$ [Mathematical formula 3]

Here, "dist" represents the distance to be measured, and the symbol θ represents the angle to be measured.

Further, from the time Ts (time stamp) when scanning has been carried out, and from the position, the attitude and the photographing time of the still image taken before and after in terms of time, the position and the attitude of the camera with respect to time Ts are calculated by interpolation. The position and the attitude of the camera obtained by interpolation are T_ts_c→w and R_ts_c→w respectively.

The measured coordinate value P_s of the scanner coordinate system is converted to a measured coordinate value P_c of the camera coordinate system.

$$P\_c = R\_s \to c * Ps + T\_s \to c$$ [Mathematical formula 4]

Next, the measured coordinate value P_c of the camera coordinate system is converted to a measured coordinate value P_w of the global coordinate system. Here, the global coordinate system means a coordinate system, which expresses the position and the attitude of the camera.

$$P\_w = Rts\_c \to w * Pc + Tts\_c \to w$$ [Mathematical formula 5]

From the above calculation, coordinates are given to the point cloud data. This is repeatedly performed on all of the scanning points.

Next, description will be given on point cloud coloring calculation in a case where the coloring is performed on the point cloud by image data.

From a certain measuring point coordinate value P_w and a position P_cc of camera sensor center with respect to an image taken immediately after the time Ts when scanning has been performed, vector T_cc→w from the camera sensor center to the measuring point is obtained.

$$T\_cc \to w = P\_w - P\_cc$$ [Mathematical formula 6]

Next, coordinate value P_20 at a point 20 meters forward from T_cc→w is obtained.

$$P\_20 = 20 * T\_cc \to w / |T\_cc \to w|$$ [Mathematical formula 7]

It is to be noted that the value of "20 meters" as given above differs according to the specification of a camera.

The value P_20 is converted from the global coordinate system to a coordinate value P_camera of a camera sensor coordinate system.

$$P\_camera = R\_w \to camera * P\_20$$ [Mathematical formula 8]

Here, R_w→camera is a rotation matrix from the global coordinate system to the camera sensor coordinate system.

$$P\_camera = \begin{pmatrix} Xd \\ Yd \\ Zd \end{pmatrix}$$ [Mathematical formula 9]

Pixel coordinates (row_p, col_p) on a panorama image when the measuring point coordinate value P_w is seen from the camera sensor center P_cc are obtained by:

$$row\_p = row\_max * \phi\_c / \pi$$

$$col\_p = col\_max * \theta\_c / \pi$$ [Mathematical formula 10]

Here, it is supposed that the size of the object image is given as row_max pixel in longitude and as col_max pixel in latitude, and that θ_c and φ_c are obtained by the following equations:

$$\theta\_c = A\,TAN(-Xd/Yd)$$

$$\phi\_c = A\,COS(Zd/20)$$ [Mathematical formula 11]

Here, the value of "20" as given above differs according to the specification of each camera.

In these circumstances, color information (RGB) is acquired from the panoramic image by row_p and col_p, and this procedure is regarded as coloring to the point cloud. This procedure is repeated on all of the scanning points.

In the 3D model image, the 3D coordinates of an arbitrary point in the image can acquire the 3D coordinates from the coordinates of the point cloud data corresponding to said arbitrary point. Further, in a case where the designated point is apart from the point of the point cloud data, TIN is calculated locally by using the point cloud data around the designated point, the designated point is interpolated to the TIN thus obtained, and 3D coordinates of the designated point can be calculated from the coordinates around the point cloud data. Further, not only by the point cloud data but also 3D coordinates of the designated point can be calculated by stereo-measurement based on photogrammetry from a plurality of images (frame images) adjacent to the designated point.

Based on image data and point cloud data acquired at a predetermined time interval while moving, i.e. photographed at a point of predetermined interval, a local 3D model at each of the photographing points can be prepared. Further, by sequentially combining the local 3D models acquired at photographing points adjacent to each other, a wide-area 3D model of the entire measurement range can be prepared.

Figure 8:
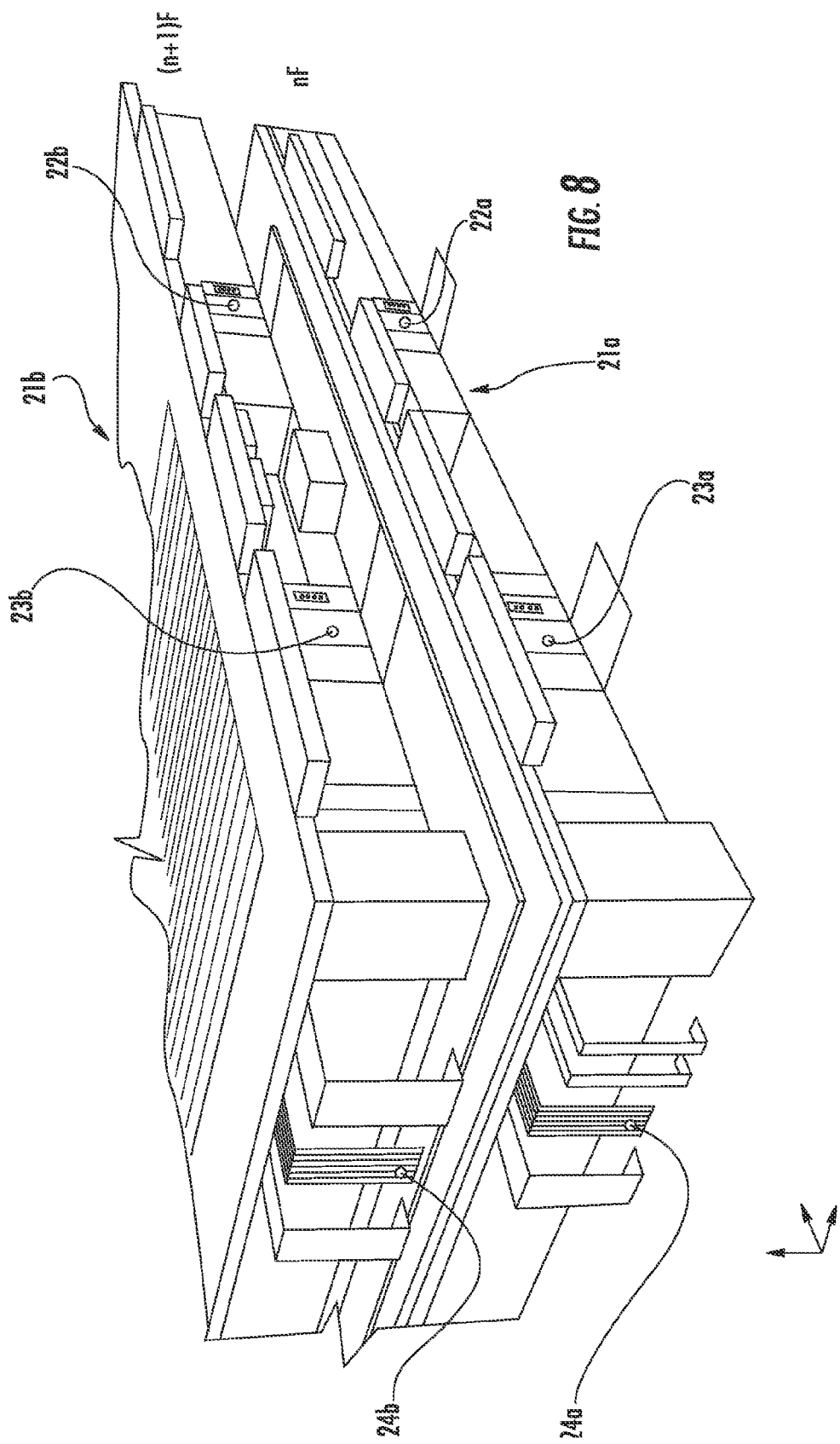
FIG. 8 is an example of display of a 3D model obtained in the present embodiment, and is a drawing synthesized in up-to bottom direction based on a reference point of a 3D model which is obtained at different floors of a building.

FIG. 8 shows an example (wide-area 3D model), which is outputted by overlapping the point cloud data with the image data.

In the example shown in FIG. 8, 3D models 21a and 21b on different stories of a building, e.g. on the n-th floor and on the (n+1)-th floor, can be acquired by the measuring instrument respectively, and the two wide-area 3D models are displayed stereoscopically by overlapping in up-to-bottom direction. As the standard of positioning of the wide-area 3D models on n-th floor and the (n+1)-th floor, for instance, the position of an elevator and the like can be used as reference points 22a, 23a, 24a, and as reference points 22b, 23b, 24b, as a common object in up-to-bottom direction. By measuring at least three points common in up-to-bottom direction, a point cloud model in up-to-bottom direction can be combined.

It is to be noted that, in the embodiment as described above, the absolute scale object 21 is used as the absolute scale acquiring means 11, and actual size was acquired by image processing, while it may be so arranged that the position where the image is acquired is actually measured by a total station. For instance, a prism is installed at a predetermined position on the measuring instrument 1, and the total station is installed at a predetermined position (a known position). The prism is at a position physically fixed (integrated) with respect to the spherical camera 8. Further, the spherical camera 8 and the prism are in a relation already known. Also, it may be so arranged that distance while tracking the prism by the total station, an absolute scale or an absolute position may be acquired according to the results of the actual measurement. Further, a time stamp is put on the result of distance measurement, and the amount of moving at the image acquiring point can be obtained.

Figure 9:
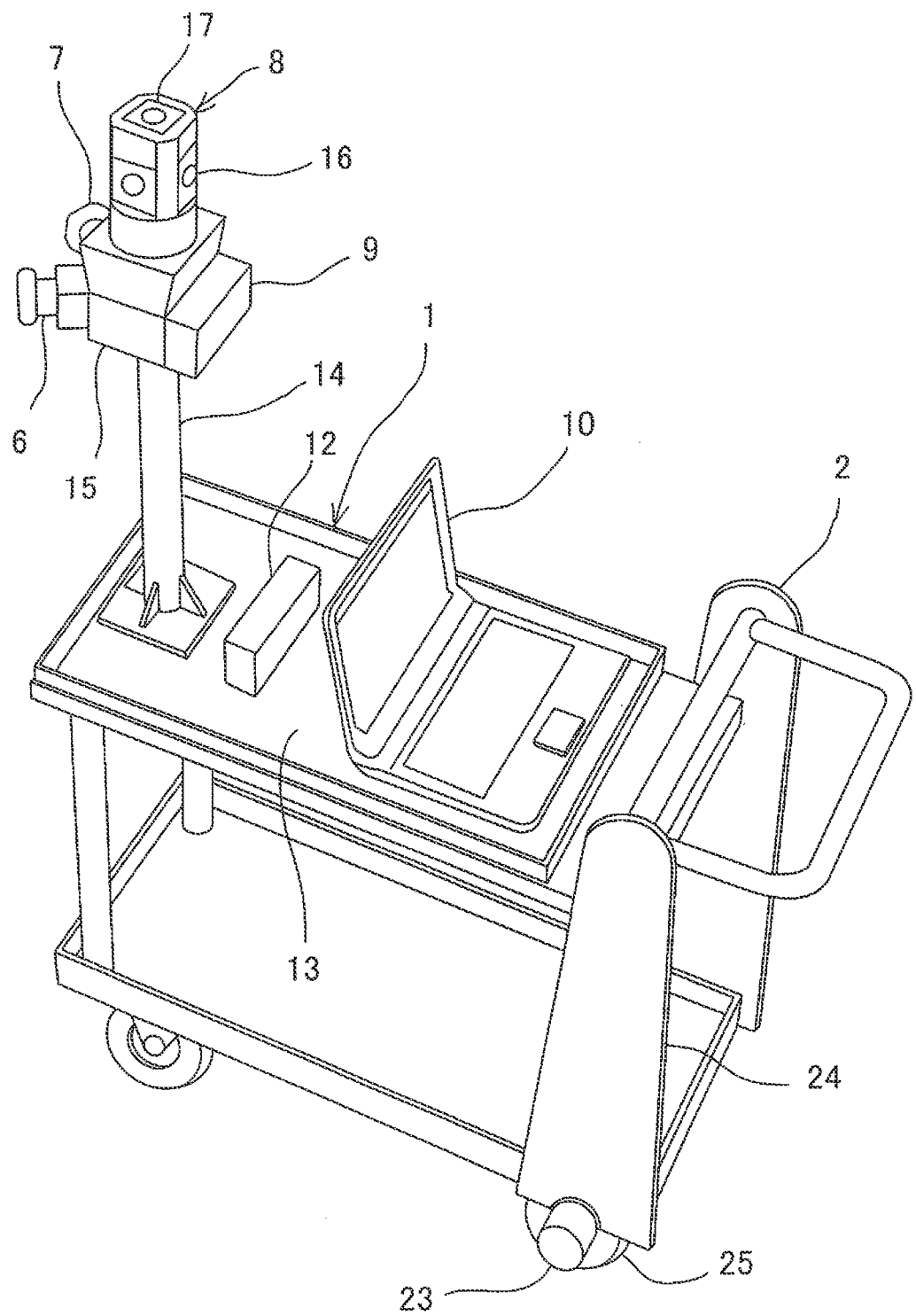
FIG. 9 is an explanatory drawing of a case where a wheel encoder is used as an absolute scale acquiring means.

Further, a wheel encoder may be used as other absolute scale acquiring means 11. FIG. 9 shows a case where a wheel encoder 23 is provided on the moving vehicle 2, on which the measuring instrument 1 is installed.

The wheel encoder 23 is installed on a fixed part such as a frame 24 of the moving vehicle 2 and connected to a rotary shaft of a running wheel 25, so as to detect a rotation angle (number of rotations) of the rotary shaft. By measuring a diameter of the running wheel 25 and by making the diameter known, the moving distance of the moving vehicle 2 can be measured based on the number of rotations of the running wheel 25 detected by the wheel encoder 23.

Further, by providing the wheel encoders 23 on the left and right running wheels 25 with respect to the advancing direction respectively, a difference of rotation of the running wheels 25 at the left and the right can be detected, and even in a case where the moving vehicle 2 changes the direction, the moving direction and the moving distance can be measured. In this case, also, the position of the image acquiring point can be measured by putting a time stamp on the output from the wheel encoder 23 at the predetermined time interval.

Further, the preparation of the 3D model may be calculated by the control arithmetic unit 10 after the acquiring of the image data by the spherical camera 8 and after the acquiring of the distance measurement data by the laser scanners 6 and 7, or the 3D model may be calculated in parallel to the acquiring of the data.

As described above, according to the present embodiment, the self-localization can be easily specified and three-dimensional point cloud model can be prepared in a low-cost arrangement under such environment where positional information cannot be acquired from the GPS, without using an expensive IMU.

The invention claimed is:

1. A measuring instrument, comprising an spherical camera for acquiring image data over total circumference, a laser scanner installed integrally with said spherical camera and for acquiring point cloud data of the surroundings, a synchronous control unit for controlling acquisition of data of said spherical camera and said laser scanner, a storage unit for recording said image data and said point cloud data, an absolute scale acquiring means for acquiring an absolute scale for obtaining an absolute position of when images are photographed by said spherical camera, a control arithmetic unit, and a moving vehicle,
   wherein at least said spherical camera, said laser scanner, said synchronous control unit, and said storage unit are provided on said moving vehicle,
   wherein said absolute scale acquiring means includes an absolute scale object, on which a scale in provided to indicate an already known length, provided at a predetermined position within a photographing range which said spherical camera photographs while said moving vehicle is moving, and
   an absolute scale acquiring program for extracting said absolute scale object from the image and for thereby acquiring said absolute scale for image correction, wherein said control arithmetic unit includes an image processing program, an image tracking program, a photogrammetry program, a program for acquiring said absolute scale from the image, a program for converting a relative length in the image to actual size and a program for calculating a 3D model based on the image data and on the point cloud data,
   determines the actually measured value of the moving amount of the moving vehicle from the image before and after moving based on said absolute scale as acquired by said absolute acquiring means, regards the actually measured value of the moving amount as a base line length necessary for photogrammetry, and
   calculates a 3D model based on the image acquired by said spherical camera, said base line length and said programs.

2. A measuring instrument, comprising an spherical camera for acquiring image data over total circumference, a laser scanner installed integrally with said spherical camera and for acquiring point cloud data of the surroundings, a synchronous control unit for controlling acquisition of data of said spherical camera and said laser scanner, a storage unit for recording said image data and said point cloud data, an absolute scale acquiring means for acquiring an absolute scale for obtaining an absolute position of when images are photographed by said spherical camera, a control arithmetic unit, and a moving vehicle,
   wherein at least said spherical camera, said laser scanner, said synchronous control unit, and said storage unit are provided on said moving vehicle, wherein said absolute scale acquiring means includes a prism integrally provided with said spherical camera, and a total station, which is installed at an already known position, tracks said prism and measures said prism and acquires photographing positions of said spherical camera based on a measurement result of said total station, wherein said control arithmetic unit includes an image processing program, an image tracking program, a photogrammetry program, a program for converting a relative length in the image to actual size and a program for calculating a 3D model based on the image data and on the point cloud data, determines the actually measured value of the moving amount of the moving vehicle from the image before and after moving based on said photographing positions as acquired by said absolute acquiring means, regards the actually measured value of the moving amount as a base line length necessary for photogrammetry, and calculates a 3D model based on the image acquired by said spherical camera, said base line length and said programs.

3. A measuring instrument, comprising an spherical camera for acquiring image data over total circumference, a laser scanner installed integrally with said spherical camera and for acquiring point cloud data of the surroundings, a synchronous control unit for controlling acquisition of data of said spherical camera and said laser scanner, a storage unit for recording said image data and said point cloud data, an absolute scale acquiring means for acquiring an absolute scale for obtaining an absolute position of when images are photographed by said spherical camera, a control arithmetic unit, and a moving vehicle, wherein at least said spherical camera, said laser scanner, said synchronous control unit, and said storage unit are provided on said moving vehicle, wherein said absolute scale acquiring means includes a wheel encoder provided on a wheel of said moving vehicle, actually measures the moving amount of said moving vehicle based on a rotation angle detected by said wheel encoder and a diameter of said wheel and obtains the moving amount as an absolute scale, wherein said control arithmetic unit includes an image processing program, an image tracking program, a photogrammetry program, a program for converting a relative length in the image to actual size and a program for calculating a 3D model based on the image data and on the point cloud data, determines the actually measured value of the moving amount of the moving vehicle from the image before and after moving based on said absolute scale as acquired by said absolute acquiring means, regards the actually measured value of the moving amount as a base line length necessary for photogrammetry, and calculates a 3D model based on the image acquired by said spherical camera, said base line length and said programs.

4. A measuring instrument according to claim 1, wherein said synchronous control unit synchronously controls the acquisition of said image data by said spherical camera at predetermined time intervals and the acquisition of said point cloud data by said laser scanner when said moving vehicle is moving, the time of acquisition of said image data and said point cloud data are put on said image data and said point cloud data as time stamps, and said image data and said point cloud data are associated with each other based on said time stamps.

5. A measuring instrument according to claim 4, wherein said control arithmetic unit carries out photogrammetry based on images adjacent to each other, converts the position where each of the images have been acquired based on said absolute scale obtained by said absolute scale acquiring means to an absolute scale, calculates the position where said point cloud has been acquired based on said absolute scale, synthesizes said point cloud data to said image, prepares a local 3D model, and further, said control arithmetic unit sequentially combines the 3D models adjacent to each other, and prepares a wide-area 3D model of the entire measurement range.

6. A measuring instrument according to claim 2, wherein said synchronous control unit synchronously controls the acquisition of said image data by said spherical camera at predetermined time intervals and the acquisition of said point cloud data by said laser scanner when said moving vehicle is moving, the time of acquisition of said image data and said point cloud data are put on said image data and said point cloud data as time stamps, and said image data and said point cloud data are associated with each other based on said time stamps.

7. A measuring instrument according to claim 6, wherein said control arithmetic unit carries out photogrammetry based on images adjacent to each other, converts the position where each of the images have been acquired based on said absolute scale obtained by said absolute scale acquiring means to an absolute scale, calculates the position where said point cloud has been acquired based on said absolute scale, synthesizes said point cloud data to said image, prepares a local 3D model, and further, said control arithmetic unit sequentially combines the 3D models adjacent to each other, and prepares a wide-area 3D model of the entire measurement range.

* * * * *